Patented Dec. 17, 1935

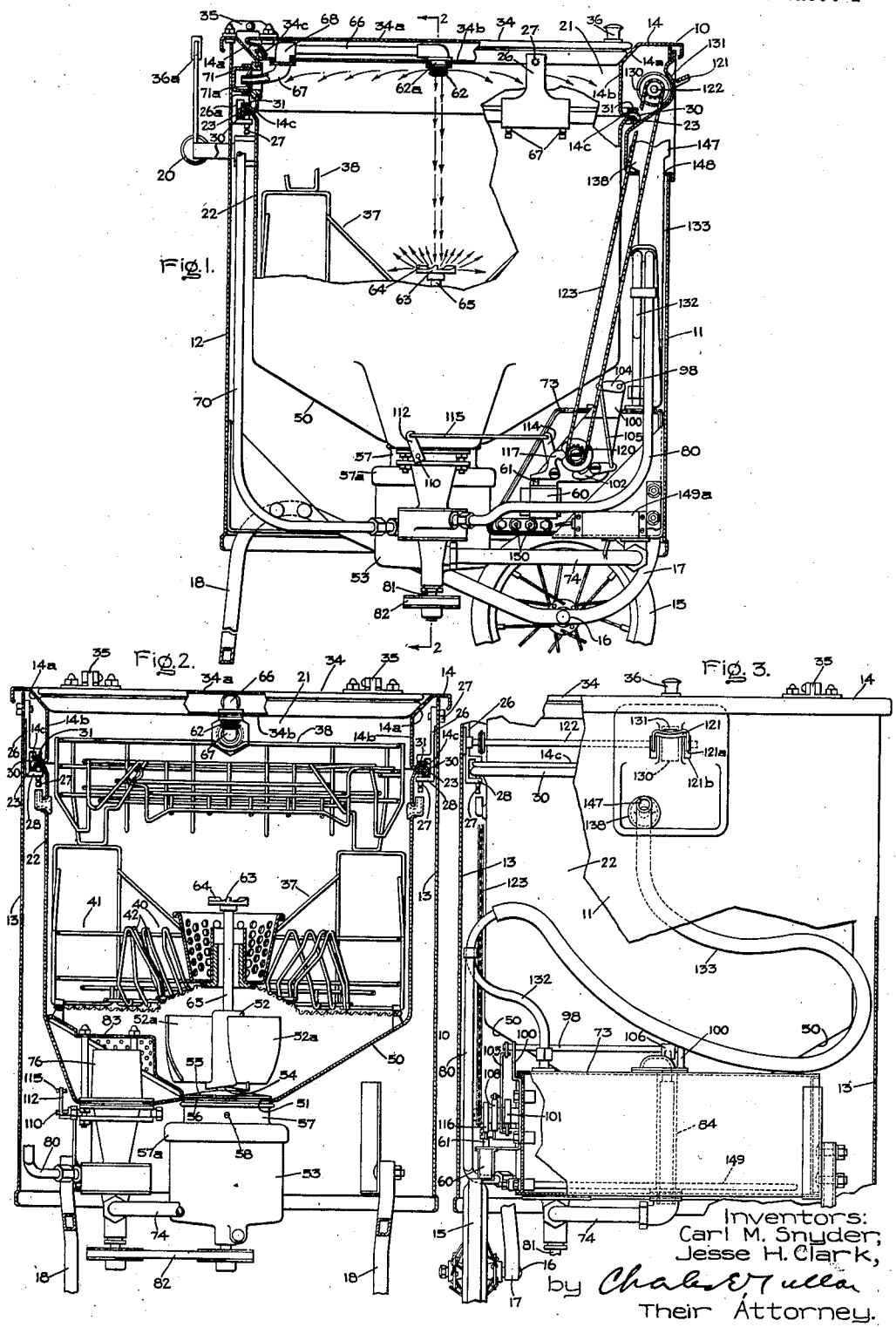
Dec. 17, 1935.  C. M. SNYDER ET AL  2,024,952
WASHING APPARATUS
Filed March 24, 1933  2 Sheets-Sheet 1
Inventors:
Carl M. Snyder,
Jesse H. Clark,
Their Attorney.

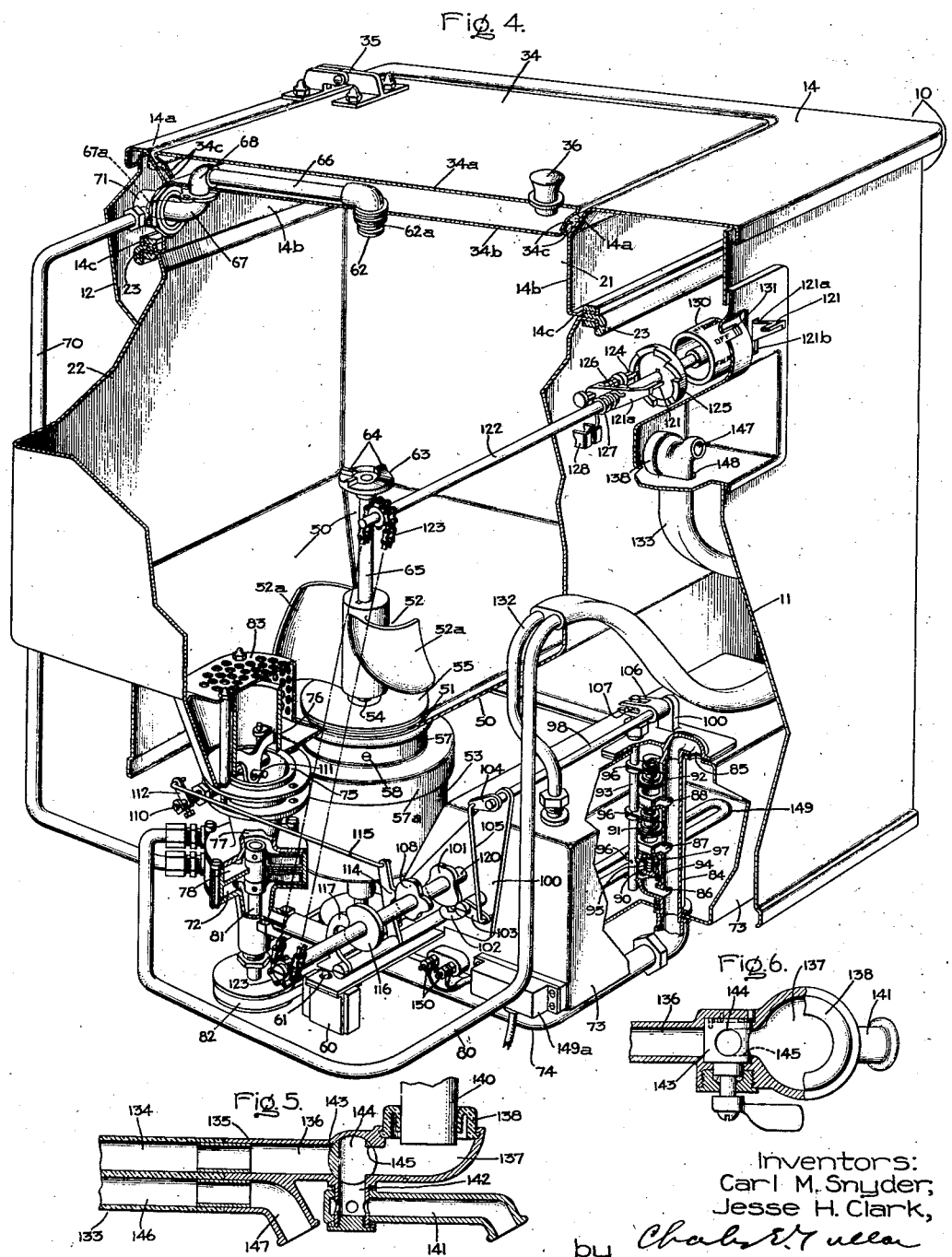

2,024,952

UNITED STATES PATENT OFFICE 2,024,952

WASHING APPARATUS

Carl M. Snyder, Glen Ellyn, and Jesse H. Clark, Cicero, Ill., assignors to Walker Dishwasher Corporation, Chicago, Ill., a corporation of Delaware Application March 24, 1933, Serial No. 662,450

9 Claims. (Cl. 141—9)

This invention relates to washing apparatus, more particularly to apparatus for washing dishes, and has for its object the provision of improved apparatus of this character.

While not limited thereto, the invention is particularly adapted to washing apparatus wherein a cleansing fluid, such as water, is circulated or hurled through the washing chamber or vat by suitable power driven means, such as a motor driven impeller.

In one of its aspects, the invention contemplates the provision of improved dishwashing apparatus whereby a plurality of cleansing operations including rinsing and washing operations can be effected in a comparatively simple and efficient manner.

In one form of the invention, a washing vat or chamber is provided for receiving the dishes or utensils to be cleansed and also a suitable cleansing fluid, such as water. A fluid reservoir is provided for receiving water from a suitable source of supply, such as the faucet ordinarily found in kitchens. This reservoir has a sufficiently large capacity to provide all of the water necessary for the various rinsing and washing operations. A suitable valve mechanism is provided for controlling communication between the reservoir and the vat so as to allow predetermined quantities of water to flow from the reservoir to the vat for successive cleansing operations; the valve mechanism is arranged so that a predetermined quantity of water can be supplied to the vat for a preliminary rinsing, then another quantity for a washing operation proper and still another quantity for a final rinsing operation.

Preferably, a suitable pump will be provided for forcing the water supplied by the reservoir into the vat under pressure.

And a pump is also provided for withdrawing soiled water from the vat when it is desired to drain the vat. A drain valve is provided for the vat arranged when open to establish fluid communication between the vat and the drain pump.

Within the lower portion of the vat is a suitable impeller arranged to engage the water which has been supplied to and allowed to accumulate in the vat so as to throw it upwardly and outwardly to effect a cleansing action on the dishes in the vat. Preferably, this impeller will be driven by a suitable electric motor.

The valve mechanism controlling the fluid communication between the reservoir and the vat, the drain valve and the switching means for the impeller motor are controlled by means of suitable cams which in turn are controlled by a manually operable control member. This member is arranged to actuate the cams to successive controlling positions so as to establish a predetermined cycle of operation of the fluid supply and drain valves and of the impeller driving motor, whereby a predetermined cleansing cycle, including rinsing and washing operations, can be effected.

For a more complete understanding of the invention, reference should be had to the accompanying drawings in which Fig. 1 is an elevation of dishwashing apparatus embodying the invention, portions being shown in section and portions being broken away so as to illustrate certain structural details; Fig. 2 is a sectional elevation taken through the line 2—2 of Fig. 1 looking in the direction of the arrows; Fig. 3 is a front elevation of the apparatus of Fig. 1, portions being broken away and portions shown in section so as to illustrate certain structural details; Fig. 4 is a fragmentary perspective view of the washing apparatus of Figs. 1, 2 and 3, portions being broken away so as to illustrate certain structural details; Fig. 5 is an elevation in section of certain fluid supply and drain conduit means adapted to be used with the washing apparatus of Figs. 1, 2, 3 and 4; and Fig. 6 is a plan view of the apparatus shown in Fig. 5, portions being shown in section so as to illustrate certain structural details.

Referring to the drawings, the invention is shown in one form as applied to dishwashing apparatus of the portable type, although it is to be understood that it is equally applicable to dishwashing apparatus of the stationary or fixed type. As shown in the drawings, the invention is shown as applied to portable dishwashing apparatus comprising a casing 10 having a front wall 11, a rear wall 12, a pair of side walls 13 connecting these walls and a top wall 14. These walls, as shown, are suitably shaped and joined together to define a substantially rectangular casing. The walls are formed from a suitable sheet material, such as steel, preferably enameled, and may be formed integrally as one piece, or formed separately and secured together in any suitable manner, as by welding. As shown, the front and rear walls and side walls are formed integrally of one sheet, while the top wall 14 is shown as a separate member.

The casing is supported at its front end by means of a pair of wheels 15 having bearings 16 in suitable supporting brackets 17 secured to the walls of the casing, and at its rear by means of suitable legs 18.

Attached to the rear wall 12 of the casing is a handle 20 whereby this end of the casing may be elevated and the entire apparatus moved on the front wheels 15.

The top wall 14, as shown, is supported directly above the upper edges of the front, back and side walls. This top wall 14 is provided with a top horizontal portion, as shown, and a portion 14a that extends inwardly of the casing at an angle to the horizontal portion, this inclined portion in turn terminating in a vertically arranged wall portion 14b. The vertical wall portion 14b at its lower end terminates in an outwardly extending horizontal flange 14c. It will be observed that by reason of the foregoing arrangement the wall 14b defines an opening 21 of substantially square shape.

This opening 21 is adapted to receive a washing chamber or vat 22 of the washing apparatus. This vat is formed of some suitable material, such as sheet metal, shaped to define a relatively deep chamber, square in cross-section, as clearly shown in the drawings. The inner side walls 14b of the top member 14 are arranged to support the vat in a substantially vertical position within the casing 10. For this purpose the front, rear and side walls of the vat 22 are provided at their upper edges with an out-turned flange 23 which is arranged to engage and cooperate with the inturned flange 14c provided on the wall 14b.

The flange 23 on the upper end of the vat is clamped to the flange or ledge 14c of the walls 14b by means of supporting brackets 26. These brackets function to support both the top wall 14 in its proper position relative to the side, front and rear walls of the casing 10 and also to support the vat 10 from the flange 14c. It will be observed that each of these members 26 is provided with an arm rigidly secured to the adjacent wall of the casing by means of screw fastening means 27 and with a jaw 28 which is arranged to clamp the flanges 14c and 23 securely together. If desired, additional clamping members 26a may be provided for these flanges. Preferably, a suitable sealing member 30, such as a rubber gasket, will be interposed between the flanges 14c and 23 so as to provide a water-tight joint between these members. This flange, as shown, will have a substantially U-shape, the legs of the U facing the opposite sides of the flange 23 provided on the vat, and the gasket will extend around the complete periphery of this flange. If desired, a suitable resilient member 31 may be provided on the upper surface of the flange 14c on which the clamping members rest.

A suitable removable cover member 34 is provided for the vat 22. This cover, as shown, is provided with suitable hinge means 35 securing it to the rear portion of the top wall 14. The cover is provided with a handle or knob 36 whereby it may be conveniently moved between its closed and open positions. Preferably, the cover will be provided with outer and inner walls 34a and 34b joined by inclined side walls 34c defining a hollow construction; the inclined walls 34c are arranged to fit the inclined portion 14a of the top wall 14. Preferably, the vat 22 and its cover 34 will be formed from a suitable rust resisting steel, which will be plated or enameled. A suitable upright supporting member 36a mounted on the handle 20 is provided to support the cover when the latter is in its open position. The handle 20 may be arranged to move out relative to the casing 10 when it is desired to support the cover on the member 26a.

Suitable dish-supporting open-work baskets or racks 37 and 38 are removably supported in the lower and upper portions of the vat 22. While any suitable dish and utensil supporting racks may be used, it is preferable to use racks arranged substantially in accordance with those described and claimed in the copending application of Forrest A. Walker, Serial No. 621,042, filed July 6, 1932 and assigned to the same assignee as this invention.

The bottom wall of the vat 22 is provided with a plurality (four) of inclined portions 50 sloped downwardly toward the center of the bottom of the vat where the walls terminate in an opening 51 arranged centrally of the vat.

In the lower portion of the vat above the opening 51 is a suitable impeller 52 arranged to rotate on an axis substantially coaxial with the vertical axis of the vat and with the axis of the central opening 51. The impeller 52 is operated by means of an electric motor 53 mounted below the bottom wall of the vat and having its shaft 54 extending through the opening 51 and operably connected with the impeller.

The impeller 52, as shown, is provided with a plurality of blades 52a which may have any suitable shape, the important feature being that the blades be given such a shape that fluid supplied to the vat and allowed to collect in its lower inclined bottom 50 will be engaged by the blades and circulated upwardly and outwardly in an efficient manner through the dish-supporting racks 37 and 38.

The motor 53 is supported from the bottom wall of the vat by means of a suitable bushing 55 which, as shown, is provided with a flange resting on that portion of the bottom wall surrounding the opening 51. The bushing is provided with a portion 56 extending downwardly through the opening to the exterior of the vat. Surrounding this portion 56 is a frame 57 which is secured to the portion by means of a plurality of circumferentially spaced set screws 58. The frame 57, as shown, is provided with an enlarged skirt-like portion 57a to which the motor 53 is directly connected in any suitable manner. It will be understood that a fluid-tight connection will be provided between the bottom wall 50 and the bushing 55.

The motor 53 may be any suitable electric motor either of the alternating current or of the direct current type and is provided with a controlling switch 60 which in turn is provided with an operating member 61 (Figs. 1, 3 and 4).

Cleansing fluid, such as water, is supplied to the vat through a suitable distribution or spray device 62 carried by the vat cover 34. The spray device 62 is provided with a vertical portion 62a which is provided with circumferentially spaced apertures arranged to cause water supplied to the spray device to issue laterally from the spray device so as to be hurled completely over all portions of the area of the upper rack 38, as indicated by arrows in Fig. 1. The spray device is also provided at its lower end with a wall in which are a plurality of apertures arranged so that water issuing from them will fall directly downwardly in the vat, as indicated by arrows in Fig. 1.

Arranged directly beneath the lower apertures is a suitable water distributing member 63 which is arranged to be rotated by the motor 53, and which is so arranged that when it does rotate it will engage the water falling directly on it from the spray device 62 to engage it and hurl it over and about the dishes and utensils supported in the racks 37 and 38.

This spray device 63, as shown, comprises a disc-like member on the upper surface of which a plurality of circumferentially spaced abutments or blades 64 are provided. These abutments, as shown, extend radially of the disc 63 and are so arranged that when the disc is rotated they will engage the water falling upon the disc so as to hurl the water upwardly and outwardly through the vat, as indicated by the arrows in Fig. 1. The spray device 63 is carried by means of a shaft 65 extending upwardly from the impeller and which may be, if desired, a continuation of the motor shaft 54.

Water is supplied to the spray device 62 by means of a conduit 66 carried by the cover 34 preferably between its top and bottom walls 34a and 34b. The conduit 66 in turn communicates with a conduit 67 carried by the cover 34 beneath its bottom wall 34b by means of a suitable fluid connection member 68. A supply of fluid is conducted to the member 67 by means of a conduit 70 which is arranged within the casing 10 between the rear wall 12 of the casing and the corresponding rear wall of the vat, and which at its upper end communicates with a suitable fluid connection member 71. This member 71 cooperates with the conduit member 67 so that when the cover 34 is moved to close the vat, a fluid connection will be established between the conduit 70 and the conduit 66. As shown, the conduit member 67 is provided on its end with a nozzle-like portion 67a which is received by a receptacle in the fluid connection member 71 so as to provide a fluid connection between these members; for this purpose, the member 71 carries a resilient apertured diaphragm or washer 71a that receives the nozzle 67a when the cover is closed, as clearly shown in Fig. 1. As shown, the water supplied will act against the diaphragm so as to force it tightly against the nozzle 67a.

The lower end of the conduit 70 communicates with a suitable supply pump 72 which is arranged when rotated to force water up through the conduit 70 and to the spray device 62. The intake of this supply pump communicates with a suitable reservoir 73 by means of a conduit 74 so that water which is supplied to this conduit from the reservoir will be pumped directly by the pump to the spray device 62.

The vat is provided with a suitable drain port 75 which is controlled by means of a drain valve 76. This drain valve, as shown, is of hollow cylindrical form and is so arranged that when it is closed its upper end constitutes an over-flow passageway for the vat. The drain port 75 communicates with a drain passageway 77 which in turn communicates with the intake of a discharge pump 78. The discharge of this pump is connected with a drain conduit 80.

Preferably, and as shown, the fluid supply and drain pumps 72 and 78 will be provided with a common operating shaft 81 which is driven by the impeller motor 53 through a suitable belt drive 82.

It will be observed that the drain port 75 is provided at the lowermost portion of the vat so that all fluid within the vat can be pumped from it. Preferably, a suitable screen 83 will be interposed between the vat and its drain port 75.

The conduit 74 for supplying fluid to the fluid supply pump 72 communicates with an upright conduit 84 in the reservoir 73 which extends from its bottom wall to its top wall. This conduit communicates with the reservoir through an opening or port 85 in the top wall, and at vertically spaced fluid levels by means of ports 86, 87 and 88 respectively. The port 86, it will be observed, is spaced somewhat from the bottom wall of the vat; the port 87 communicates with the reservoir at a higher level; while the port 88 communicates with the reservoir at a still higher level.

The ports 86, 87 and 88 are controlled by means of valves 90, 91 and 92 respectively which are provided with a common operating rod or member 93. Each valve has the same construction and it is believed that it will be unnecessary therefore to describe more than one of them. For example, the valve 90 is provided with a closure portion 94 which is carried by a suitable hollow stem 95. The stem 95 in turn is mounted in a bracket member 96 carried by the rod 93 and which is provided with an aperture for receiving the stem, as clearly shown in Fig. 4. Mounted within the stem 95 is a spring 97 which bears against a suitable abutment that may be the next adjacent port structure 87, as shown in Fig. 4. The spring 97 functions to bias the valve to its closed position. The valve is moved to its open position against the bias of the spring by moving the rod 93 upwardly, as viewed in Fig. 4. It will be observed that when the rod is thus moved upwardly, the bracket 96 will be moved upwardly to engage the valve to move it to open its associated port. The valves 91 and 92 have the same construction as has the valve 90 and are operated in the same fashion.

However, the brackets 96 for operating the valves are so arranged on the rod 93 and the lengths of the stems 95 are such that when the rod is moved upwardly, the valve 92 will first be opened and then the valve 91 will be opened and finally the valve 90 will be opened.

The rod 93 is operated by means of a suitable shaft 98 mounted in bearings 100 provided for it, and the shaft 98 in turn is operated by means of a suitable controlling cam 101. This cam 101 engages a follower 102 which is arranged to operate a crank arm 103. The crank arm 103 is connected with a crank arm 104 carried by the shaft 98 by means of a suitable link 105. The shaft 98 is mechanically connected with the rod 93 through a suitable crank arm 106 mounted on the shaft and engaging a pin 107 carried by the upper end of the rod 93 which protrudes from the upper wall of the reservoir 73, as clearly shown in Fig. 4. It will be observed that by reason of the foregoing arrangement, when the cam moves its follower 102 in a counter-clockwise direction, as viewed in Fig. 4, the crank arms 104 and 106 will be moved in a clockwise direction and hence, the rod 93 will be elevated by the latter crank arm.

The drain valve 76 is also operated by means of a suitable cam. As shown, a cam 108 is provided for this purpose. The valve is operated immediately between its open and closed positions by means of a shaft 110 which, as shown, is provided with a crank 111 engaging the valve 76 to move it between its open and closed positions when the shaft is operated, and with a crank 112 arranged when operated to move the shaft. The crank arm 112 is mechanically connected to a follower 114 for the cam 108 through a link 115. It will be observed that when the cam 108 moves its follower in a counter-clockwise direction, the valve will be operated to its open position, whereas when the cam releases its follower, the valve will be closed under the influence of its own weight.

The switch 60 is also operated by means of a cam. For this purpose, a cam 116 is provided. This cam cooperates with a suitable follower 117 which in turn is arranged to engage the actuating member 61 of the switch. When the follower 117 is moved by its cam in a counter-clockwise direction, as viewed in Fig. 4, it will engage the switch arm 61 to close the switch and hence, energize the motor, whereas when the follower 117 is allowed to move in a clockwise direction, the switch will open. It will be understood that suitable resilient means (not shown) will be provided for automatically moving the switch to its open position when the follower 117 is released.

The cams 101, 108 and 116 are mounted on a common operating shaft 120 which is operated by means of a suitable manually operable control member 121. The shaft 120, as shown, is mechanically connected to a shaft 122 by means of a suitable chain drive 123. The shaft 122, as shown, is mounted in the upper front portion of the casing 10 between the front wall 11 and the corresponding front wall of the vat 22. The shaft 122 is arranged to be rotated by movement of the lever 121 so as to impart movement to the shaft 120. The lever 121 in turn is mechanically connected to operate the shaft 122 through successive steps, by successive operations of the lever 121.

The lever 121, as shown, has a substantially U-shape, the arms 121a of the U being mounted to rotate freely on the shaft 122. These arms project through suitable slots 121b provided for them in the front wall of the casing.

The mechanical connection between the operating lever 121 and the shaft 122 comprises a pawl 124 which engages a suitable ratchet wheel 125 secured to the shaft 122. One of the arms 121a, the left hand arm, as viewed in Fig. 4, carries the pawl 124. The pawl is biased by means of a compression spring 126 into engagement with the teeth of the ratchet 125; and the arm 121a that carries the pawl is biased in a counter-clockwise direction, as viewed in Fig. 4, by means of a spring 127 coiled about the shaft 122 and having one end engaging the arm 121a and its other end engaging a suitable abutment 128 provided for it on the adjacent wall of the vat. This spring functions to return the lever 121 after it has been depressed.

It will be observed that by reason of the foregoing arrangement, when the control member 121 is depressed, it will carry the ratchet wheel 125 and the shaft 122 through one step of motion. It will be understood that the throw of the lever 121 and the spacing of the ratchet teeth will be such that the shaft 122 and the connected shaft 120 will be turned through the proper angle for each operation of the lever 121.

It will be also understood that the cams 101, 108 and 116 will be suitably arranged upon the shaft 120 and will have suitable shapes so as to effect a predetermined sequence of operation of the fluid supply valves 90, 91 and 92, the drain valve 76 and the controlling switch 60 when the shaft 120 is rotated through successive steps by the operation of the lever 121.

Preferably and as shown, a suitable indicating device will be provided for showing to the attendant the successive positions of the shaft 122 and also any particular controlling position that the shaft happens to be in. For this purpose, a suitable indicating drum 130 is secured to the shaft 122. On the surface of this drum appear suitable indicia indicating the various controlling positions; thus for example, the word "Off" indicating the off position of the apparatus is indicated on the drum. Similarly, the "1st rinse" position, the "Wash" position, and the "Final rinse", etc. are indicated on the outer surface of the drum. These indicia are arranged to appear to the attendant through a suitable window 131 arranged in the front wall 11 of the casing 10.

The reservoir 73 is supplied with fluid through a conduit 132 which, as shown, communicates with a suitable flexible conduit member 133. This flexible conduit member is provided with a passageway 134, (Fig. 5), which communicates with the conduit 132. The passageway 134 in turn may communicate with a suitable faucet attachment member 135 which, as shown (Figs. 5 and 6), is provided with a conduit 136 in direct communication with the conduit 134. The conduit 136 terminates in a chamber 137 which is arranged to be attached to or connected with a faucet or other suitable source of water supply. A flexible nipple 138 is secured to the walls of the faucet attachment, this member, as shown, being arranged to receive a discharge nozzle 140 of a suitable faucet. It will be observed that the nipple 138 has a substantially U-shaped cross-section so that when water is turned on, the water pressure building up between the legs of the U will serve to force the nipple tighter against the faucet.

The conduit 136 is also arranged to communicate with a suitable discharge nozzle 141 attached to the faucet member 135 through a conduit 142. Communication between the conduit 136 and the chamber 137 and the nozzle 141 respectively is controlled by means of a valve 143 which, as shown, is provided with a transverse passageway 144, and a passageway 145 arranged at right angles to it and communicating with it. When the valve is in the position shown in Fig. 5, it will establish communication between the faucet chamber 137 and the discharge nozzle 141 so that even though the faucet attachment 135 is connected with a faucet the attendant may draw water directly from the faucet by moving the valve 143 to its position shown in Fig. 5. When the valve is rotated in a counter-clockwise direction, as viewed in Fig. 5, so that its passageway 144 is aligned with the passageway 136, water may flow directly from the faucet to the conduits 136 and 134. Preferably, the nozzle 141 will be arranged to rotate about the conduit 142 so that it may be conveniently moved to a number of discharging positions.

The flexible conduit member 133 is also utilized to drain water from the vat and for this purpose is provided with a drain conduit 146 (Fig. 5). This conduit communicates directly with the discharge conduit 80 of the pump 78, and also communicates with the faucet member 135. The faucet member 135, as shown, is provided with a discharge nozzle 147 in direct communication with the discharge conduit 146.

Thus, by reason of the foregoing arrangement, when the nozzle member 135 is attached to its supply nozzle 140, fresh water may be supplied either to the vat conduit 134 or it may be supplied at the nozzle 141. Moreover, the soiled water which is pumped from the dishwashing apparatus may be discharged from the nozzle 147 directly into the sink associated with the supply faucet 140.

The flexible conductor 133 is brought to the exterior of the casing through an aperture 148 arranged in a recess situated below the lever 121, as clearly shown in Fig. 4.

It is to be noted that in the diagrammatic view, Fig. 4, only the nipple 138 and the discharge nozzle 147 are shown. This simplified form may be used; that is, the conduit 134 may connect directly with the nipple 138, rather than through the valve and nozzle arrangement 141, 142, 143, 144, 145 shown in Figs. 5 and 6.

The faucet attachment 135 shown in Figs. 5 and 6 forms the subject matter of our copending application, Serial No. 703,448 filed December 21, 1933, which application is a division of this application and which is assigned to the same assignee as this invention.

If desired, and in some cases it is found advisable to do so, the water in the reservoir 73 may be heated to a higher temperature than that supplied to it. For this purpose, a suitable heating unit 149 of the immersion type is provided. As shown, the unit 149 is supported in one end wall of the reservoir so as to extend transversely across the reservoir spaced somewhat from the bottom wall. Suitable terminals 150 are provided for the heating element. It will be understood that any suitable switching means may be provided for controlling the energization of the heating element. It may be controlled by the switch 60 of the motor so that when the motor is energized to rotate the impeller 52, the heating unit will be energized at the same time, or it may be controlled by a separate switch.

Any suitable heating element 149 may be used, but preferably, a heating element of the type described and claimed in the United States patent to C. C. Abbott No. 1,367,341, dated February 1, 1921 will be used. A suitable thermostat 149a responsive to the temperature of the water in the reservoir 73 is provided to control the heating unit 149 to maintain a substantially constant temperature in the water. The specific details of this thermostat have not been illustrated because any suitable thermostat may be used.

In the operation of the washing apparatus, it will be understood that the dishes and like utensils to be cleansed will be placed in their respective supporting baskets or trays 37 and 38, and the filler member 135 will be attached to a faucet 140.

Under the initial conditions, with the control shaft 122 and its drum 130 in their positions shown in Fig. 4, that is, in the "Off" position, the controlling cams will be in such positions that the drain valve 76 will be opened, the motor switch 60 will be opened so that the motor will be deenergized and the supply valves 90, 91 and 92 will be in positions to close their associated ports 86, 87 and 88.

Then the faucet will be turned on so as to allow water to flow through the conduits 134 and 132 into the reservoir 73. Just before the faucet is turned on or at about the same time, the lever 121 is depressed which operation will move the drum from its "Off" position to its first "Rinse" position. This will move the cam shaft 120 to another controlling position; in this position of the shaft the drain valve 76 will remain open, the valves 90, 91 and 92 will remain open and the motor switch 60 will be closed so as to energize the motor 53. In response to this operation of the switch the motor 53 will drive the impeller 52 and the spray device 63 and also the pumps 72 and 78. The water which is supplied to the reservoir 73 will flow through the conduit 84 into the intake of the supply pump 72 from where it will be pumped through the conduit 70, the conduit 67 and the conduit 66 to the spray device 62. A portion of this water, as previously pointed out, is spread out all over the upper rack 38, while a portion of it will fall upon the spray device 63 from where it will be hurled throughout the dish supporting racks 37 and 38. As long as the shaft 120 is in this controlling position, water will flow from the supply source to the pump 72 from which it will be forced through the spray device 62. The water which falls to the bottom of the vat will flow into the discharge pump 78 from where it will be pumped through the drain conduits 80 and 146 to the nozzle 147 where it will be discharged to the sink.

This preliminary spray has several functions, namely, it removes cold water from the hot water line, it washes off loose particles of food soil from the dishes and other utensils, and it heats up the vat and its contents, thereby preventing excessive cooling of the heated water which is provided for the main washing operation.

After this preliminary operation, the washing operation proper can be effected by again depressing the lever 121 which moves the cam shaft 120 to a "Fill" position. This operation of the shaft will close the valves 90, 91 and 92 so that the water that is supplied to the tank will be retained in it; the drain valve will remain open; and the motor 53 will be energized. When the tank is full, water will flow through the over-flow port 85 and into the conduit 84 from which conduit it will be pumped into the vat through the spray device 62, and from the vat will flow into the drain. This water finding its way into the drain is pumped through discharge conduits 80 and 146 and appears at the nozzle 147. The water appearing at the nozzle 141 will constitute a visual signal to the attendant that the reservoir 73 has been filled.

Then the control lever 121 will be depressed again which operation moves the cam shaft 120 to the "Wash" position. This moves the cams to such controlling positions that the drain valve 76 will be closed and the valve rod 93 will be operated so as to open the upper valve 92; the motor switch 60 will still be closed to energize the motor 53.

This will allow all of that portion of the water in the reservoir 73 above the level of the port 88 to flow into the intake of the pump 72 which will pump this measured quantity of water through the spray device 62 and into the vat. Under these conditions, the water which falls into the bottom of the vat will not be allowed to flow out from it because the drain valve 76 will have been moved to its closed position by the operation of the lever 121. This water which collects in the bottom of the vat will be engaged by the impeller blades 52a and hurled upwardly and outwardly through the dish-supporting racks 37 and 38 so as to effect a thorough cleansing action on the dishes supported in them. If desired, a suitable detergent may be placed in the vat for this washing operation proper.

When the dishes have been thoroughly cleansed in this manner, the lever 121 will again be depressed so as to move the shaft 120 to another position, which operation will move the drain cam to such a position that it will open the drain valve, thereby allowing the soiled fluid in the vat to be discharged into the sink by the discharge pump 78. In this position of the cam shaft 120, the valves 90, 91 and 92 will remain in the positions that they had previously to this last operation of the lever 121, and the impeller motor switch will still be closed to maintain an energizing circuit for the motor.

After the soiled water ceases to flow through the nozzle 141 into the sink, the control lever 121 will again be depressed, which operation moves the cams to such controlling positions that the drain valve 76 will again be closed and the valve 91 controlling the port 87 will be opened. By reason of this operation, water in the reservoir above the port 87 will be allowed to flow to the supply pump 72 which will pump it into the vat. This measured quantity of water will collect in the vat and, as before, will be hurled upwardly and outwardly through the dish supporting racks by the operation of the impeller. This operation may be used merely to rinse the dishes, or a detergent may be added to the vat so as to effect a second washing action, if this is desired.

When this operation has been completed, the control lever 121 will again be depressed which will move the cams to such controlling position that the drain valve will be opened, thereby allowing the pump 78 to discharge the water from the vat to the drain.

When the vat is empty, the control lever 121 will again be depressed, as a result of which, the valve 90 will be opened, thereby allowing the water in the reservoir above the port 86 to be pumped into the vat. Under these conditions, however, the drain valve 76 will also be in its open position so that the water which is supplied to the vat will find its way to the drain pump from which it will be discharged into the sink. This operation constitutes a final rinse. It will be observed that the final rinse water has never been in contact with the soiled water at any time nor has it been in contact with any part of the mechanism that has been in contact with the soiled water, and hence, it cannot be contaminated by any of the food soil or dirty water.

As a matter of fact, for each of the cleansing operations a fresh supply of water is supplied which is pumped into the vat through mechanism which does not at any time come into contact with the soiled water.

When water ceases to appear at the nozzle 147 the attendant will know that the final rinsing operation has been completed, whereupon the lever 121 will again be depressed; this operation returns the cam 120 to its "Off" position. In the "Off" position, the valves 90, 91 and 92 are opened, the drain valve 76 is opened and the motor switch 81 is opened to deenergize the motor and also the heating element 149, if it has been connected to be controlled by the motor switch.

If a separate switch is provided to control the unit 149 it may be operated to energize and deenergization the unit at any suitable time.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What we claim as new and desire to secure by Letters Patent of the United States, is:—

1. Washing apparatus comprising a vat, a fluid reservoir, means for supplying fluid to said reservoir, a conduit between said reservoir and said vat, an upright conduit in said reservoir connected with said first conduit and provided with a plurality of ports arranged at different fluid levels, valves controlling said ports, means controlling the operation of said valves to successively open said ports from the higher to the lower liquid levels and an overflow conduit at the top of said reservoir communicating with said upright conduit.

2. Dishwashing apparatus comprising a vat, a spray device in said vat, a fluid reservoir, means for supplying said reservoir with a cleansing fluid, a conduit communicating with said reservoir at a plurality of different fluid levels, valve means controlling said conduit, a cam for operating said valve means so as to connect said conduit with said reservoir at successively lower fluid levels, a pump in said conduit arranged to pump fluid supplied to said conduit from the conduit to said vat through said spray device, a drain valve for said vat, a pump for pumping fluid from said vat to a drain, a cam controlling the movement of said drain valve between its closed and open positions, fluid circulating means in said vat, a motor for driving said fluid circulating means, a controlling switch for said motor, a cam for operating said switch, a common operating shaft for said cams arranged when moved to successive positions to effect a predetermined cycle of operations of said first named valve means, said drain valve and said motor and a single manually operable control member for moving said cam shaft through said successive controlling positions.

3. Dishwashing apparatus comprising a vat, a spray device in the upper portion of said vat arranged to spray fluid over a substantial area of the upper portion of said vat and at least a portion of the fluid supplied to it downwardly in said vat, means for conducting a cleansing fluid to said spray device, a second spray device in the path of movement of said fluid that is directed downwardly comprising a disc and radial ribs on said disc arranged when the disc is rotated to engage the falling fluid so as to hurl it in spray form through said vat, and means for rotating said disc.

4. Dishwashing apparatus comprising a vat, a fluid supply reservoir for said vat, means for supplying fluid to said reservoir, a conduit between said supply reservoir and said vat through which fluid in said reservoir is supplied to said vat, a pump in said conduit for forcing fluid from said reservoir to said vat, a drain conduit for said vat, a second separate pump in said drain conduit for withdrawing fluid from said vat, and said conduit between said reservoir and said vat having an over-flow port communicating with the upper portion of said reservoir so that when fluid is supplied to said reservoir after it has been filled the excess fluid flows into said conduit.

5. Dishwashing apparatus comprising a vat, a spray device in said vat, a fluid circulating impeller in said vat, means for driving said impeller, a fluid reservoir, means for supplying said reservoir with a cleansing fluid, a conduit communicating with said reservoir at a plurality of ports located at different fluid levels, supply valves controlling said ports, a pump in said conduit arranged to pump fluid supplied to said reservoir to said spray device, a drain valve for said vat arranged when closed to provide for the accumulation of fluid in said vat and means controlling said pump, said supply and drain valves and said means for driving said impeller comprising a single operating member arranged in one position to open said supply valves while said drain valve is open and said pump is operated so that fluid supplied to said reservoir is pumped continuously from said reservoir to said spray device as long as said operating member is in said one position, and in other positions said supply valves are operated when said pump is operated to supply but predetermined quantities of fluid from said reservoir to said vat, in one position while said drain valve is in its open position and in another position when said drain valve is closed to cause said fluid to accumulate in said vat, and said impeller driving motor is operating to effect the circulation of said accumulated fluid in said vat.

6. Dishwashing apparatus comprising a vat, a spray in said vat, a fluid circulating impeller in said vat, a motor for driving said impeller, a fluid reservoir, means for supplying said reservoir with a cleansing fluid, a conduit communicating with said reservoir at a plurality of ports located at different levels and an over-flow port at the top of said reservoir, supply valves controlling said ports other than said over-flow port which is continually open to said reservoir, cams for operating said supply valves so as to connect said conduit with said reservoir at successively lower fluid levels, a pump in said conduit arranged to pump fluid supplied to said conduit from the conduit to said spray, a drain valve for said vat, a pump for pumping fluid from said vat to a drain, a cam controlling the movement of said drain valve between its closed and open positions, a driving connection between said pumps and said motor, a controlling switch for said motor, a cam for operating said switch, a common operating shaft for all of said cams arranged when moved to successive positions to effect a predetermined cycle of operations of said supply valves, said drain valve and said motor wherein in one controlling position of said shaft said pumps are operated while said drain valve is open and all of said supply ports are open, whereby fluid supplied to said reservoir is pumped continuously to said spray device and from said vat to said drain as long as said member is in said one position, in another position all of said supply valves are closed while said drain valve is open so that said fluid supplied to said reservoir first fills said reservoir after which the over-flow is pumped into said vat and from said vat to said drain, and in still other positions of said shaft said supply valves are operated to allow predetermined quantities of fluid to flow from said reservoir to said pump and then to said vat, in one case when said drain valve is operated to its open position and in another case when said drain valve is closed to cause the fluid supplied to said vat to accumulate therein for agitation by said impeller.

7. Dishwashing apparatus comprising a vat, a fluid reservoir, means for supplying said reservoir with a cleansing fluid, an upright conduit within said reservoir connected with said vat, a plurality of valves within said reservoir at different levels controlling said conduit so as to successively admit the fluid above said levels to said vat, an operating rod for said valves within said reservoir extending from said reservoir, and means on the exterior of said reservoir for operating said rod.

8. Dishwashing apparatus comprising a vat, a fluid reservoir adjacent said vat, means for supplying said reservoir with a cleansing fluid, a conduit within said reservoir and connected with said vat, valve means within said reservoir controlling said conduit at selected liquid levels in said reservoir so as to provide for the transfer of predetermined quantities of fluid from said reservoir to said vat, a valve operating member in said reservoir having a portion extending therefrom, fluid circulating means in said vat, a motor for operating said fluid circulating means, a drain valve for said vat and a single manually operable control member controlling the operation of said motor, said drain valve and said valve operating member extending from said reservoir.

9. Dishwashing apparatus comprising a casing, a vat within said casing, a fluid reservoir outside of said vat, but within said casing, a conduit entering said casing and connected with said reservoir for supplying said reservoir with a cleansing fluid, an upright conduit within said reservoir, a conduit connecting the lower end of said conduit with said vat, valves within said reservoir controlling said upright conduit at selected levels so as to provide for the transfer of predetermined quantities of fluid from said reservoir to said vat, a valve operating member within said reservoir having a portion extending therefrom, fluid circulating means in said vat, a motor for operating said fluid circulating means, a switch controlling said motor, a drain valve for said vat, cams controlling the operation of said valve operating member, said drain valve and said switch, a common shaft for operating said cams so as to establish a predetermined sequence of operation of said valves in said reservoir, said drain valve and said motor, and a control member for operating said shaft.

CARL M. SNYDER.
JESSE H. CLARK.